(No Model.) 3 Sheets—Sheet 1.

R. C. SCOTT.
ART OF AGING OR TREATING SPIRITS.

No. 532,399. Patented Jan. 8, 1895.

(No Model.) 3 Sheets—Sheet 3.
R. C. SCOTT.
ART OF AGING OR TREATING SPIRITS.
No. 532,399. Patented Jan. 8, 1895.

Witnesses.
B. W. Miller
Guy E. Davis

Inventor
Richard C. Scott,
By his Attorneys
Baldwin Davidson & Wight

UNITED STATES PATENT OFFICE.

RICHARD CLARKSON SCOTT, OF LIVERPOOL, ENGLAND

ART OF AGING OR TREATING SPIRITS.

SPECIFICATION forming part of Letters Patent No. 532,399, dated January 8, 1895.

Application filed April 17, 1894. Serial No. 507,909. (No model.) Patented in England June 21, 1892, No. 11,638.

*To all whom it may concern:*

Be it known that I, RICHARD CLARKSON SCOTT, manufacturer, a subject of the Queen of Great Britain, residing at 24 Drury Buildings, 21 Water Street, Liverpool, England, have invented certain new and useful Improvements in the Art of Treating or Aging Spirits, (for which I have received Letters Patent in Great Britain, No. 11,638, dated June 21, 1892,) of which the following is a specification.

According to this invention the spirit is exposed to the action of a stream or streams of cold air—that is to say at about freezing point or below as distinguished from the comparatively warm air hitherto employed. By this means loss of strength, flavor, bouquet and aroma is avoided. The air is only brought once into contact with the spirit and then passes away to the atmosphere or to be purified and used again. In order that as large surfaces as possible of the spirit and air may be exposed to each other the spirit is preferably sprayed by means of the stream of cold air. In all cases I prefer that the spirit should be cooled to about 32° Fahrenheit or below before injecting it into the vessel.

Figure 1:
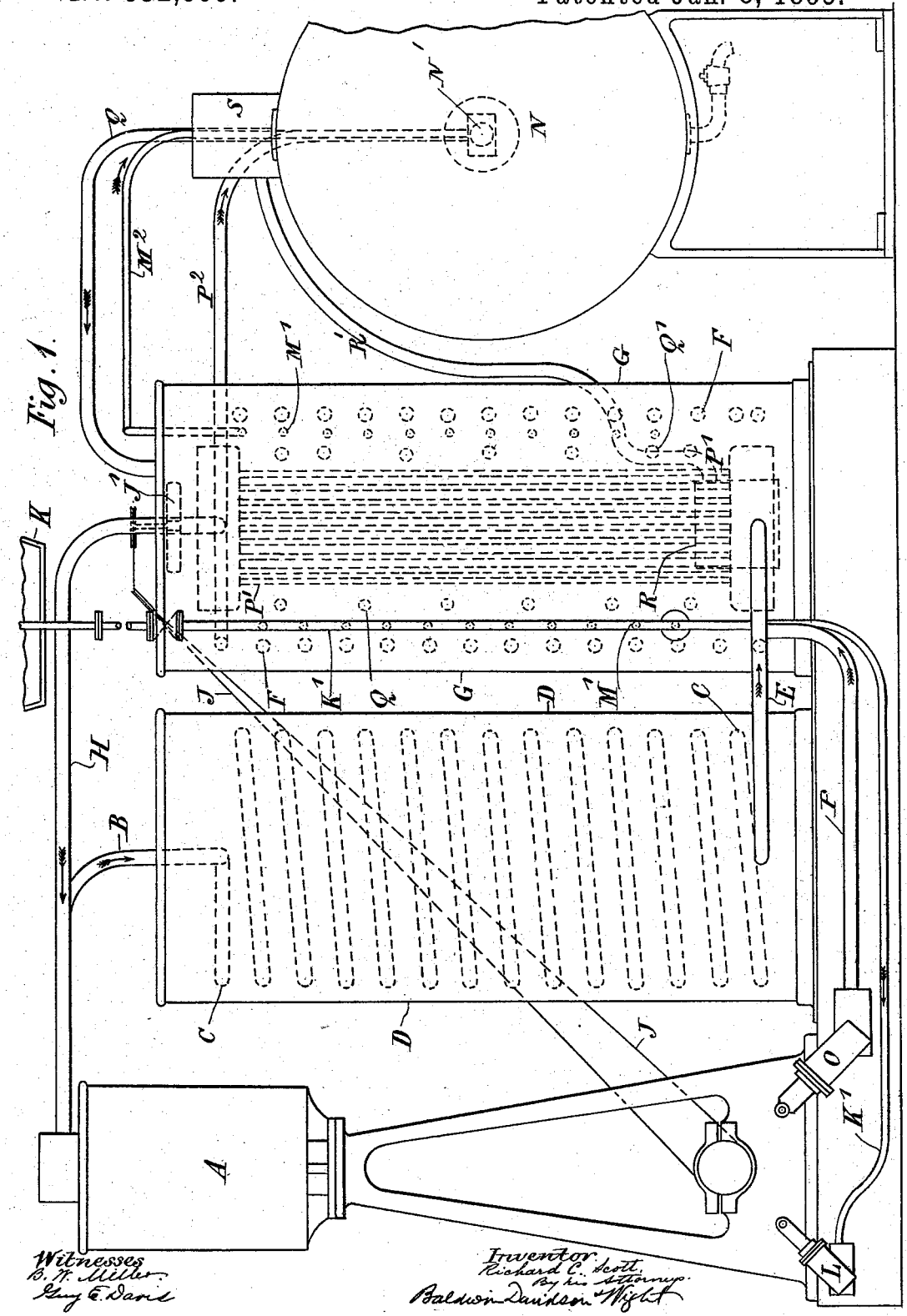
Figure 2:
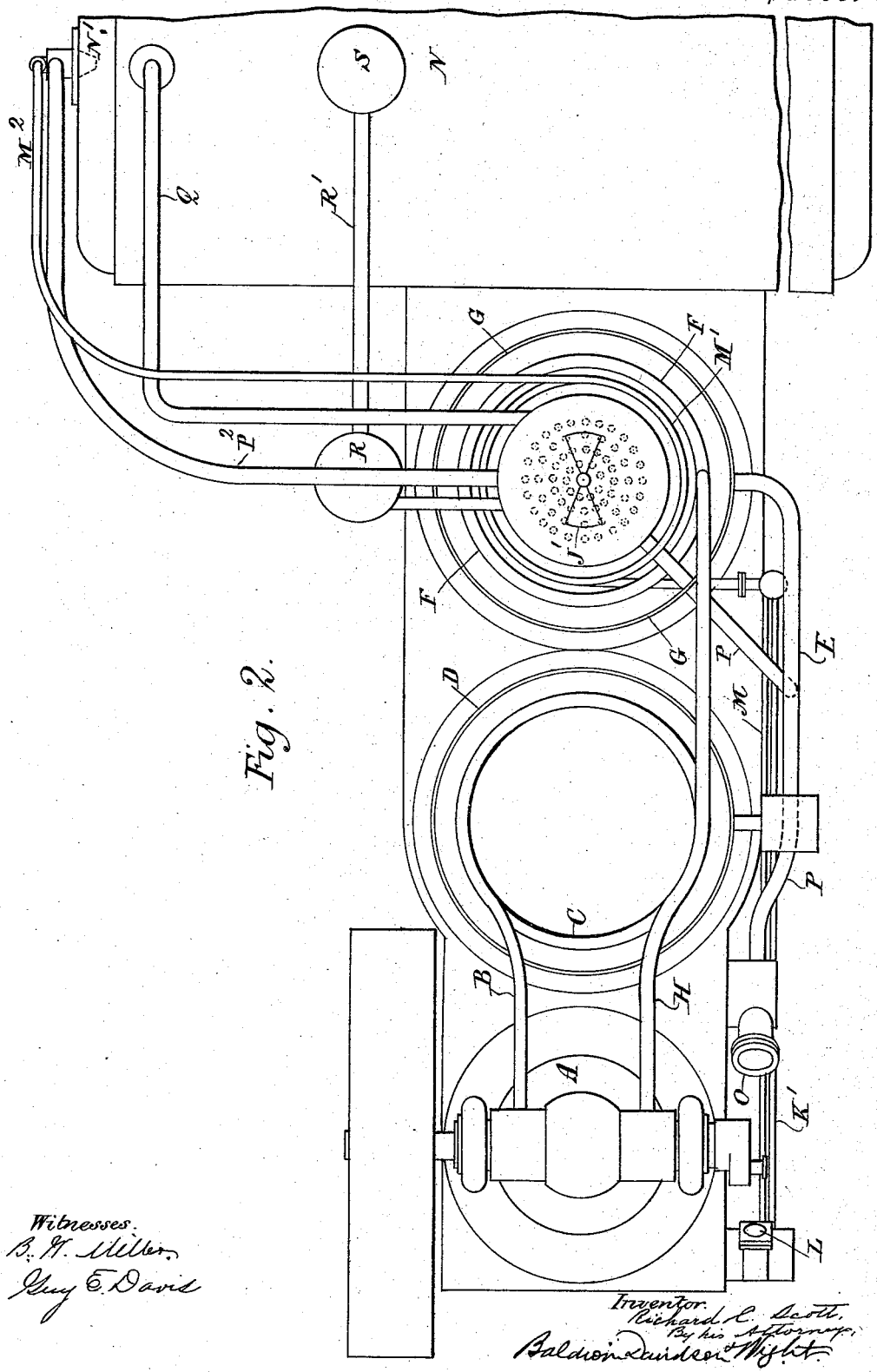
Figure 3:
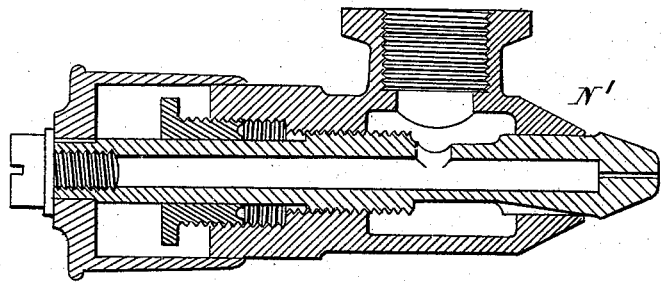

Figure 1 is an elevation and Fig. 2 a plan of an apparatus for carrying out the invention. Fig. 3 is a view of a sprayer to a larger scale.

In this apparatus the air and spirit are cooled by ammonia or other suitable gas may be employed.

A is the pump by which the ammonia is compressed into the pipe B and coil C the latter being in the vessel D through which a stream of cold water is continuously passed. The coil C is connected by the pipe E with the coil F in the vessel G containing brine and the top of the coil F is connected with the pipe H which leads the ammonia back to the pump A.

J is a band driving the turbine J' for circulating the brine in the vessel G.

Apparatus of this class is well known and requries no further description.

K is a vessel containing spirit which is led by the pipe K' to the pump L from whence it passes by the pipe M up through the coil M' in the vessel G and by the pipe M² to the sprayer N' in the vessel N. The construction of the sprayer N' is clearly shown in Fig. 3. If the vessel K be at a sufficient altitude the pump L may be omitted and the pipe K' be connected directly to the bottom of the coil M'.

O is a pump drawing in air preferably filtered from the atmosphere and forcing it by the pipe P, nest of tubes P' (in the vessel G) and pipe P² to the sprayer N'.

Q is a pipe connected to the top of the vessel N above the sprayer. It leads the impure air from the vessel N to the top of the coil Q' in the vessel G and so by the pipe Q² to the vessel R in which condensation collects and may be drawn off from time to time the air passing by a pipe R' to an outlet S. The spirit in the vessel N may be agitated with a turbine so as further to expose it to the air.

The vessels used in conducting the process may very advantageously be old sherry casks.

What I claim is—

1. The herein-described art of treating or aging spirit which consists in spraying it in or by means of a stream of constantly-changing air, whose temperature is about 32° Fahrenheit, or below.

2. The herein-described art of treating or aging spirit which consists in cooling it to about 32° Fahrenheit, or below, and spraying it in or by means of a stream of constantly-changing air, whose temperature is about 32° Fahrenheit, or below.

RICHARD CLARKSON SCOTT.

Witnesses:
T. F. BARNES,
   17 *Gracechurch St., London, E. C.*
WILFRED CARPMAEL,
   24 *Southampton Bldgs., London.*